(12) United States Patent
Tangudu et al.

(10) Patent No.: US 12,155,280 B2
(45) Date of Patent: Nov. 26, 2024

(54) SLOT COOLING FINS IN ELECTRICAL MACHINES

(71) Applicant: Hamilton Sundstrand Corporation, Charlotte, NC (US)

(72) Inventors: Jagadeesh Kumar Tangudu, South Windsor, CT (US); Thomas M Yun, Glastonbury, CT (US); Andrew S Babel, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/083,337

(22) Filed: Dec. 16, 2022

(65) Prior Publication Data

US 2023/0123354 A1    Apr. 20, 2023

Related U.S. Application Data

(62) Division of application No. 16/922,808, filed on Jul. 7, 2020, now Pat. No. 11,557,943, which is a division
(Continued)

(51) Int. Cl.
| | |
|---|---|
| H02K 15/02 | (2006.01) |
| H02K 1/14 | (2006.01) |
| H02K 1/20 | (2006.01) |
| H02K 3/16 | (2006.01) |
| H02K 5/18 | (2006.01) |
| H02K 9/193 | (2006.01) |
| H02K 9/22 | (2006.01) |

(52) U.S. Cl.
CPC ............. *H02K 15/024* (2013.01); *H02K 1/20* (2013.01); *H02K 3/16* (2013.01); *H02K 5/18* (2013.01); *H02K 9/193* (2013.01); *H02K 9/223* (2021.01); *H02K 9/227* (2021.01); *H02K 1/146* (2013.01)

(58) Field of Classification Search
CPC .......... H02K 15/024; H02K 1/20; H02K 3/16; H02K 5/18; H02K 9/193; H02K 9/223; H02K 9/227; H02K 1/146
USPC .............................................. 310/215, 52–54
See application file for complete search history.

(56) References Cited

U.S. PATENT DOCUMENTS

| | | | | |
|---|---|---|---|---|
| 1,115,947 A | * | 11/1914 | Lincoln ................ | H02K 1/185 310/407 |
| 2,990,487 A | | 6/1961 | Stigler et al. | |

(Continued)

FOREIGN PATENT DOCUMENTS

| | | | | | |
|---|---|---|---|---|---|
| CN | 106655552 A | * | 5/2017 | | |
| DE | 102013216207 A1 | * | 2/2015 | ............ | H02K 1/146 |

(Continued)

OTHER PUBLICATIONS

USPTO, Restriction Requirement dated Jul. 17, 2019 in U.S. Appl. No. 15/875,550.
(Continued)

*Primary Examiner* — Jose A Gonzalez Quinones
(74) *Attorney, Agent, or Firm* — SNELL & WILMER L.L.P.

(57) ABSTRACT

A method for manufacturing a stator for an electric machine comprises manufacturing a slot cooling fin to extend into a slot defined between a first tooth, a second tooth, and a stator yoke, and disposing a coil in the slot, wherein the slot cooling fin extends into the first coil.

14 Claims, 7 Drawing Sheets

Related U.S. Application Data of application No. 15/875,550, filed on Jan. 19, 2018, now Pat. No. 10,742,098.

(56) References Cited

U.S. PATENT DOCUMENTS

| | | | |
|---|---|---|---|
| 6,700,283 | B2 | 3/2004 | Kikuchi et al. |
| 7,687,945 | B2 | 3/2010 | Matin et al. |
| 7,701,106 | B2 | 4/2010 | Yuratich |
| 7,825,552 | B2 | 11/2010 | Husband et al. |
| 8,373,316 | B2 | 2/2013 | Beatty et al. |
| 8,541,924 | B2 | 9/2013 | Van Tiem et al. |
| 9,124,159 | B2 | 9/2015 | Yamada et al. |
| 9,300,179 | B2 | 3/2016 | Sawada et al. |
| 10,742,098 | B2 * | 8/2020 | Tangudu ............ H02K 3/16 |
| 11,309,749 | B2 | 4/2022 | Mittal et al. |
| 11,394,283 | B2 | 7/2022 | Walisko et al. |
| 11,557,943 | B2 * | 1/2023 | Tangudu ............ H02K 9/193 |
| 2002/0074889 | A1 | 6/2002 | Kikuchi et al. |
| 2012/0313492 | A1 | 12/2012 | Yamada et al. |
| 2015/0022050 | A1 | 1/2015 | Sawada et al. |
| 2018/0115222 | A1 * | 4/2018 | Lassila ............ H02K 1/165 |
| 2018/0269731 | A1 | 9/2018 | Ogino et al. |
| 2019/0068044 | A1 * | 2/2019 | Petrovich ............ G21C 15/00 |
| 2019/0229595 | A1 | 7/2019 | Tangudu et al. |
| 2020/0336053 | A1 | 10/2020 | Tangudu et al. |
| 2023/0123354 | A1 * | 4/2023 | Tangudu ............ H02K 9/223 310/215 |

FOREIGN PATENT DOCUMENTS

| | | |
|---|---|---|
| JP | 2014023198 | 2/2014 |
| KR | 20140134794 A * | 11/2014 |
| WO | 2004008603 | 1/2004 |

OTHER PUBLICATIONS

USPTO, Pre-Interview First Office Action dated Jul. 17, 2019 in U.S. Appl. No. 15/875,550.

USPTO, First Action Interview Office Action dated Sep. 17, 2019 in U.S. Appl. No. 15/875,550.

USPTO, Final Office Action dated Dec. 2, 2019 in U.S. Appl. No. 15/875,550.

USPTO, Advisory Action dated Feb. 10, 2020 in U.S. Appl. No. 15/875,550.

USPTO, Notice of Allowance dated Apr. 8, 2020 in U.S. Appl. No. 15/875,550.

USPTO, Notice of Allowance dated Sep. 28, 2022 in U.S. Appl. No. 16/922,808.

\* cited by examiner

SLOT COOLING FINS IN ELECTRICAL MACHINES

CROSS REFERENCE TO RELATED APPLICATIONS

This application is a divisional of, and claims priority to, and the benefit of U.S. patent application Ser. No. 16/922,808, filed on Jul. 7, 2020, and entitled "SLOT COOLING FINS IN ELECTRICAL MACHINES." The '808 application is a divisional of, and claims priority to, and the benefit of U.S. patent application Ser. No. 15/875,550, filed on Jan. 19, 2018, and entitled "SLOT COOLING FINS IN ELECTRICAL MACHINES," which issued on Aug. 11, 2020, as U.S. Pat. No. 10,742,098. All of which are incorporated by reference herein in their entirety for all purposes.

FIELD

The present disclosure relates to electric motors or electric generators, and more specifically, to a system for cooling an electric motor or electric generator.

BACKGROUND

Electrical machine stators consist of slots and teeth, with conductive coils (copper or aluminum) placed in the stator slots. When current is passed through the coils, the coils generate heat and hot spots are typically present in the middle of the coils.

SUMMARY

In various embodiments, the present disclosure provides a method of manufacturing a stator for an electric machine. The method may comprise manufacturing a slot cooling fin to extend into a slot defined between a first tooth, a second tooth, and a stator yoke, and disposing a coil in the slot, wherein the slot cooling fin extends into the first coil.

In various embodiments, the coil surrounds the slot cooling fin.

In various embodiments, the slot cooling fin extends from at least one of the stator yoke or the first tooth.

A planar member for a stator stack is disclosed herein, comprising a stator yoke defining a central longitudinal axis, a first surface facing radially outward, and a second surface facing radially inward, a tooth extending radially inwards from the second surface, a first tooth tip extending circumferentially from a radially inward end of the tooth, a second tooth tip extending circumferentially from the radially inward end of the tooth; a first slot portion defined between the first tooth tip and the second surface, a second slot portion defined between the second tooth tip and the second surface, and a slot cooling fin extending radially from the stator yoke into the first slot portion.

In various embodiments, the stator yoke, the tooth, the first tooth tip, the second tooth tip, and the slot cooling fin extend within a plane oriented orthogonal to the central longitudinal axis.

In various embodiments, the slot cooling fin comprises a cantilever.

In various embodiments, the slot cooling fin is disposed radially between the stator yoke and the first tooth tip.

In various embodiments, the first tooth tip extends circumferentially from a radially inward end of the tooth, the second tooth tip extends circumferentially from the radially inward end of the tooth, and the first tooth tip and the second tooth tip extend in opposite directions from the tooth.

In various embodiments, the slot cooling fin is configured to extend into a coil.

In various embodiments, a first end of the slot cooling fin is coupled to the stator yoke and a second end of the slot cooling fin extends into the first slot portion in a cantilevered manner.

An electric machine is disclosed herein, comprising a rotor and a stator. The stator comprises a stator yoke defining a central longitudinal axis, a first surface facing radially outward, and a second surface facing radially inward, a first tooth extending radially inwards from the second surface, a first tooth tip extending circumferentially from a radially inward end of the first tooth, a second tooth tip extending circumferentially from the radially inward end of the first tooth, a second tooth extending radially inwards from the second surface, a third tooth tip extending circumferentially from a radially inward end of the second tooth, a fourth tooth tip extending circumferentially from the radially inward end of the second tooth, a slot disposed between the first tooth and the second tooth, and a slot cooling fin. The slot comprises a first slot portion defined between the first tooth tip and the second surface, and a second slot portion defined between the third tooth tip and the second surface, wherein the slot cooling fin extends radially from the stator yoke into the first slot portion.

In various embodiments, the electric machine further comprises a coil disposed in the slot.

In various embodiments, the slot cooling fin extends into the coil.

In various embodiments, the coil surrounds the slot cooling fin.

In various embodiments, the first tooth tip and the second tooth tip extend in opposite directions from the tooth.

In various embodiments, the stator yoke, the first tooth, the first tooth tip, the second tooth tip, and the slot cooling fin extend within a plane oriented orthogonal to the central longitudinal axis.

In various embodiments, the slot cooling fin comprises a cantilever.

In various embodiments, the slot cooling fin is disposed radially between the stator yoke and the first tooth tip.

In various embodiments, the slot cooling fin is configured to cool the coil.

In various embodiments, the slot cooling fin provides a thermal path from an inner portion of the coil to the stator yoke.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
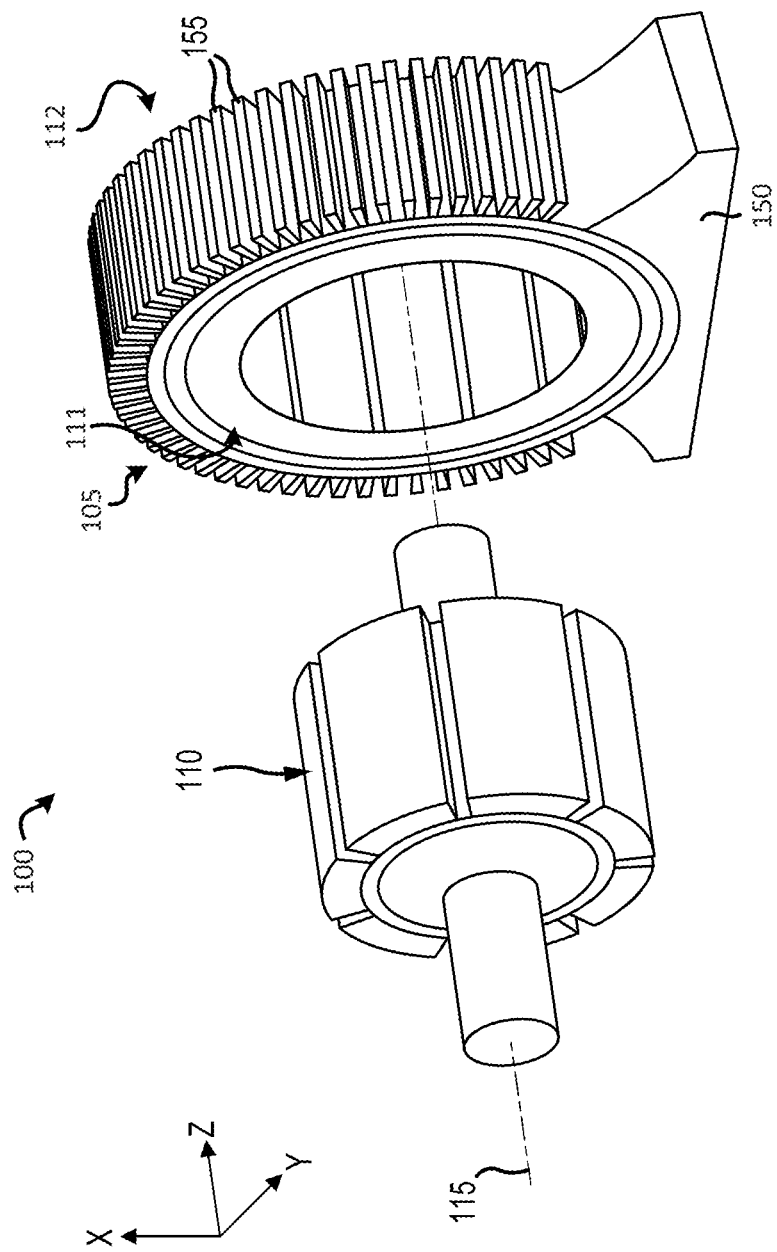
FIG. 1 is a perspective view of an electric machine, such as an electric motor or an electric generator, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

A stator of the present disclosure may aid in efficiently removing heat from stator coils (typically for concentrated winding machines, where there are less slots and more slot area). A stator of the present disclosure may aid in improving leakage inductance by providing a path for leakage flux and reducing short circuit current. Efficient heat removal from the middle of the stator slots may allow for the stator of the present disclosure to be suitable for operating at a higher current density, increased power density, increased leakage inductance, and low short circuit current.

In various embodiments, and with reference to FIG. 1, an electric machine 100, such as an electric motor or an electric generator, having a plurality of slot cooling fins is disclosed herein. An XYZ axes is provided for ease of illustration. The electric machine 100 generally includes a stator 105 and a rotor 110. In various embodiments, the electric machine 100 is an electric motor or an electric generator of an aircraft.

As used herein, the terms axial, radial, and circumferential are relative to the central longitudinal axis 115 of the stator 105. That is, a first component that is "radially outward" of a second component means that the first component is positioned at a greater distance away from the central longitudinal axis 115 of the stator 105 than the second component. Correspondingly, a first component that is "radially inward" of a second component means that the first component is positioned closer to axis 115 than the second component. Accordingly, in the case of the stator 105, components that are radially inward of other components and that rotate circumferentially about the central longitudinal axis 115 rotates through a circumferentially shorter path than the other components. Similarly, the term "axial" generally refers to a position along the central longitudinal axis 115. As used herein, "distal" refers to the direction outward, or generally, away from central longitudinal axis 115. As used herein, "proximal" refers to a direction inward, or generally, towards central longitudinal axis 115.

In various embodiments, with reference to FIG. 1, electric machine 100 includes an external housing 150. Stator 105 may be disposed within external housing 150. A plurality of external cooling fins 155 may extend from external housing 150. External cooling fins 155 may cool external housing 150. External housing 150 may comprise a metal material. External cooling fins 155 may comprise a metal material. In various embodiments, external housing 150 and external cooling fins 155 may be manufactured as a single piece.

Figure 2A:
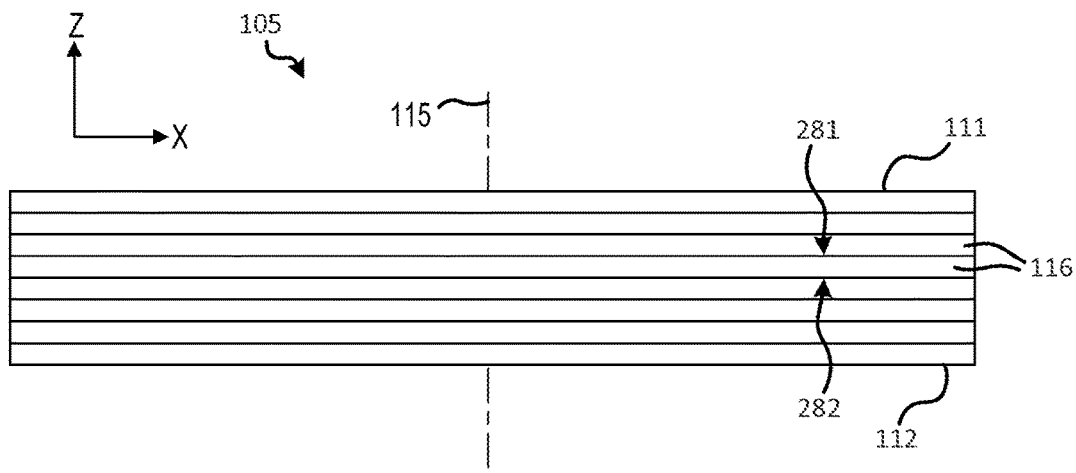
FIG. 2A is a perspective view of a slot defined in a stator stack, in accordance with various embodiments.

With reference to FIG. 2A, an isolated view of a plurality of separate planar members 116 of the stator, also referred to herein as "stator stack" 105 is illustrated, in accordance with various embodiments. Stator stack 105 may comprise central longitudinal axis 115. Stator stack 105 may include a plurality of separate planar members 116 that are held together by a binder or an adhesive. Planar members 116 may comprise silicon steel. Stator stack 105 may have a first axial end 111 and a second axial end 112 opposite the first axial end 111.

Figure 2B:
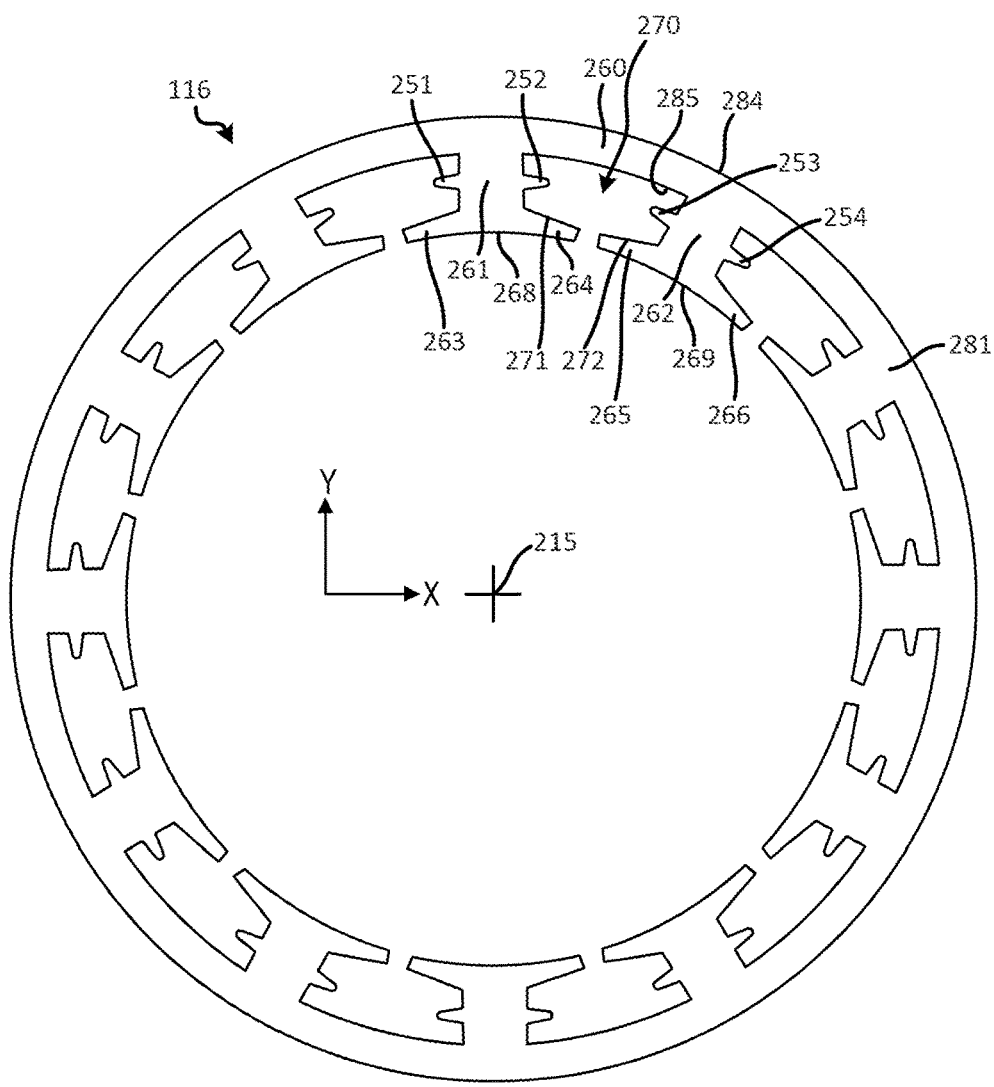
FIG. 2B is an end view of a planar member for a stator stack, in accordance with various embodiments.

With reference to FIG. 2B, an axial view of a planar member 116 is illustrated, in accordance with various embodiments. In various embodiments, planar member 116 may comprise a stator yoke 260 comprising a central longitudinal axis 215, a first axial surface 281, a second axial surface 282 opposite the first axial surface 281, a first surface 284 facing radially outward, and a second surface 285 facing radially inward. Planar member 116 may comprise a plurality of teeth extending radially inwards from second surface 285. For example, a tooth (also referred to herein as a first tooth) 261 and a tooth (also referred to herein as a second tooth) 262 may extend from second surface 285. Two tooth tips may extend circumferentially from a proximal end of each tooth. Stated differently, two tooth tips may extend circumferentially from a radially inward end of each tooth. For example, tooth tip (also referred to herein as a first tooth tip) 263 and tooth tip (also referred to herein as a second tooth tip) 264 may extend from proximal end (also referred to herein as a radially inward end) 268 of tooth 261. Tooth tip 263 may extend in an opposite direction from tooth 261 as tooth tip 264. In this regard, tooth 261, tooth tip 263, and tooth tip 264 may form a substantially T-shaped member. Similarly, tooth tip (also referred to herein as a third tooth tip) 265 and tooth tip (also referred to herein as a fourth tooth tip) 266 may extend from proximal end (also referred to herein as a radially inward end) 269 of tooth 262.

In various embodiments, a slot 270 may be formed between tooth 261 and tooth 262. Slot 270 may comprise a first slot portion 271 defined between the tooth tip 264 and stator yoke 260. First slot portion 271 may be defined between tooth tip 264 and second surface 285. Slot 270 may comprise a second slot portion 272 defined between the tooth tip 265 and stator yoke 260.

In various embodiments, a slot cooling fin may extend into a slot. For example, a cooling fin 251 may extend from tooth 261. A slot cooling fin 252 may extend from tooth 261. Slot cooling fin 252 may extend into first slot portion 271. Slot cooling fin 252 may extend in the circumferential direction from tooth 261. A slot cooling fin 253 may extend from tooth 262 into second slot portion 272. A slot cooling fin 254 may extend from tooth 262 in an opposite direction from slot cooling fin 253.

Although illustrated as extending from tooth 261 at substantially halfway between stator yoke 260 and tooth tip 264, it is contemplated herein that, in various embodiments, slot cooling fin 252 may extend from tooth 261 at any radial location between stator yoke 260 and tooth tip 264. The radial location may be chosen depending on the desired location for cooling.

Figure 3A:
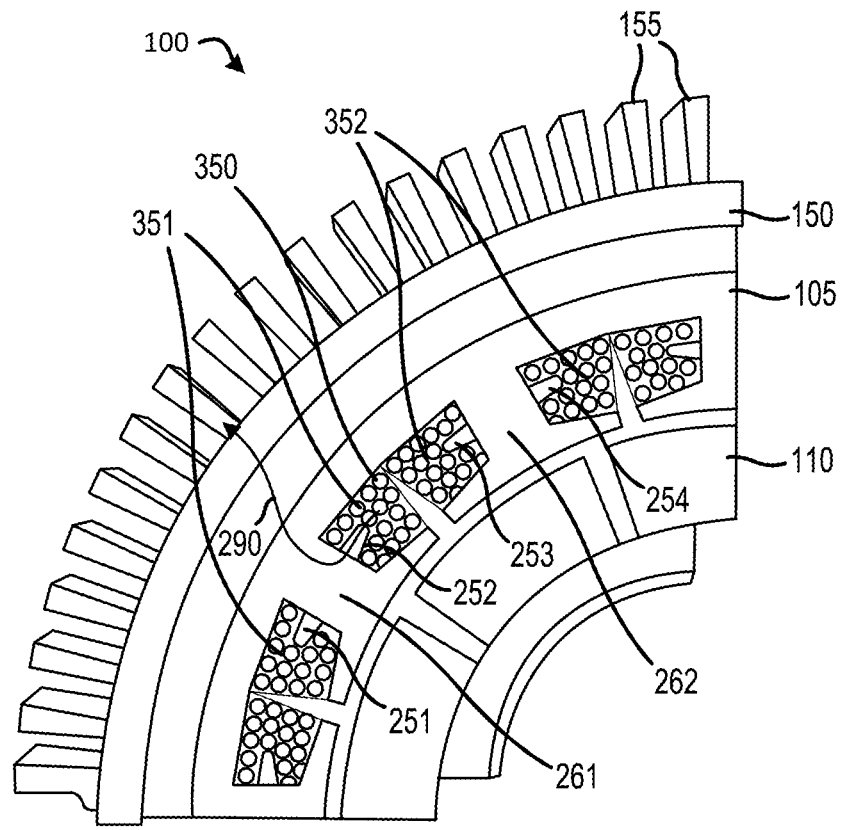
FIG. 3A is a cross-section view a stator stack having a plurality of slot cooling fins extending circumferentially into stator coils, in accordance with various embodiments.

With reference to FIG. 3A, a cross-section view of electric machine 100 is illustrated, in accordance with various embodiments. With combined reference to FIG. 2B, and FIG. 3A, stator 105 may include stator coils 350. Stator coils 350 may comprise a plurality of electrically conductive wires. In various embodiments, stator coils 350 may comprise copper, copper alloy, aluminum, aluminum alloys, nickel, nickel based alloys, titanium-based materials, or electrically conductive carbon materials, among others. Stator coils 350 may include a coil (also referred to herein as a first coil) 351 surrounding tooth 261 and a coil (also referred to herein as a second coil) 352 surrounding tooth 262. In this regard, both coil 351 and coil 352 may be at least partially disposed in slot 270.

In various embodiments, slot cooling fin 252 may extend into coil 351. Stated differently, coil 351 may surround slot cooling fin 252. During operation, slot cooling fin 252 may cool coil 351. Slot cooling fin 252 may provide a thermal path 290 for heat to travel from coil 351 to external cooling fins 155. Forming slot cooling fin 252 within coil 351 may aid in preventing localized hot spots within stator 105, as may otherwise occur if conventional techniques were employed without a slot cooling fin, according to various embodiments. Slot cooling fin 252 may comprise a cantilever. Stated differently, slot cooling fin 252 may be supported at only one end. Planar member 116 may extend within a plane oriented orthogonal to central longitudinal axis 215. Central longitudinal axis 215 may be concentric with central longitudinal axis 115, with momentary reference to FIG. 1.

Figures 3B, 3C:
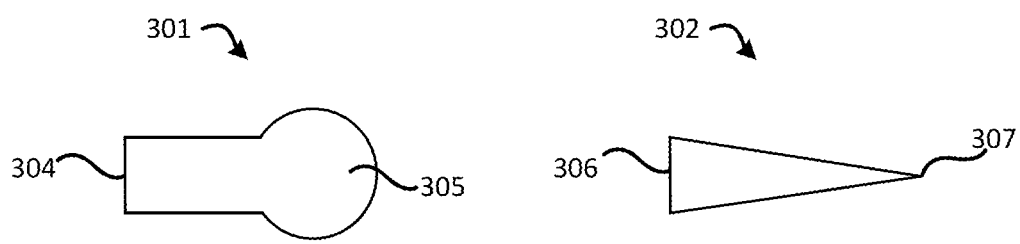
FIG. 3B is a slot cooling fin having a keyhole geometry, in accordance with various embodiments.
FIG. 3C is a slot cooling fin having a tapered geometry, in accordance with various embodiments.

With reference to FIG. 3B, a slot cooling fin 301 is illustrated, in accordance with various embodiments. Slot cooling fin 252 of FIG. 3A may be similar to slot cooling fin 301, in various embodiments. Slot cooling fin 301 may comprise a "keyhole" geometry. Stated differently, slot cooling fin 301 may comprise a swollen end 305. Slot cooling fin 301 may be coupled to planar member 116 at end 304, with momentary reference to FIG. 3A.

With reference to FIG. 3C, a slot cooling fin 302 is illustrated, in accordance with various embodiments. Slot cooling fin 252 of FIG. 3A may be similar to slot cooling fin 302, in various embodiments. Slot cooling fin 302 may comprise a tapered geometry. Stated differently, slot cooling fin 302 may be tapered from end 306 towards end 307. Slot cooling fin 301 may be coupled to planar member 116 at end 306, with momentary reference to FIG. 3A.

Figure 4:
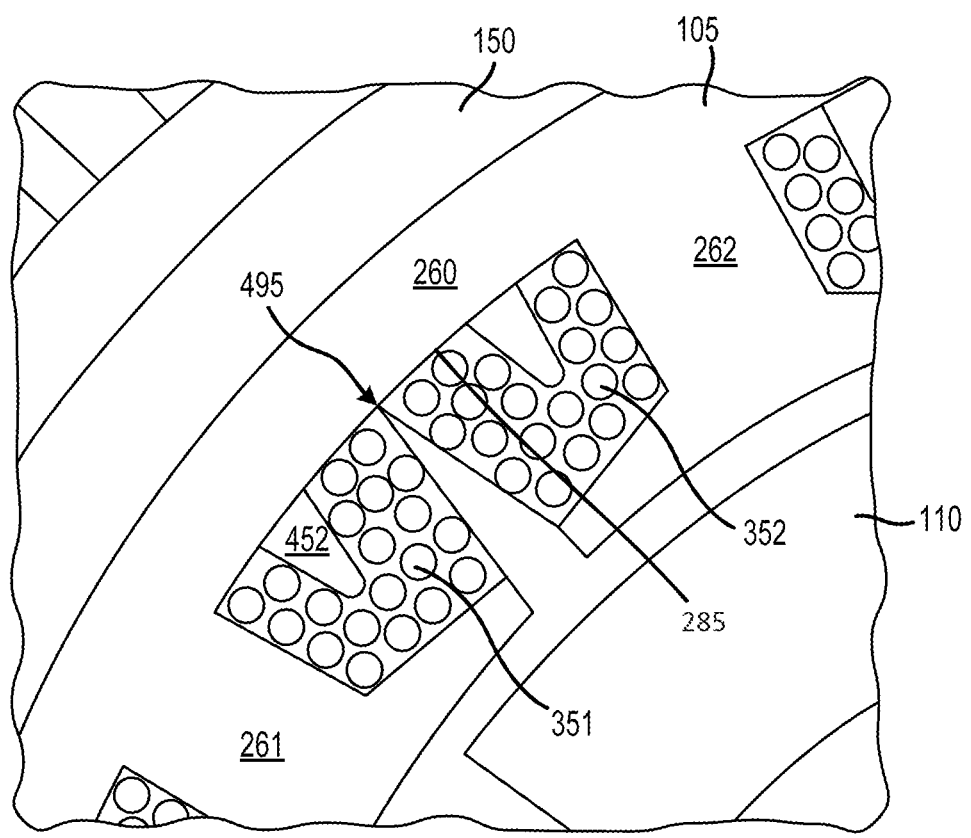
FIG. 4 is a cross-section view a stator stack having a plurality of slot cooling fins extending radially into stator coils, in accordance with various embodiments.

In various embodiments, with reference to FIG. 4, it is contemplated herein that a slot cooling fin 452 may extend radially inwards from second surface 285 of stator yoke 260. Slot cooling fin 452 may extend from second surface 285 at a location from tooth 261 which is at least one of less than or greater than a midpoint 495 between tooth 261 and tooth 262. Stated differently, slot cooling fin 452 may not be a divider between coil side 351 and coil side 352, but rather may extend into an inner portion of coil side 351. In various embodiments, slot cooling fin 454 may be circumferentially aligned with tooth tip 264.

Figure 5:
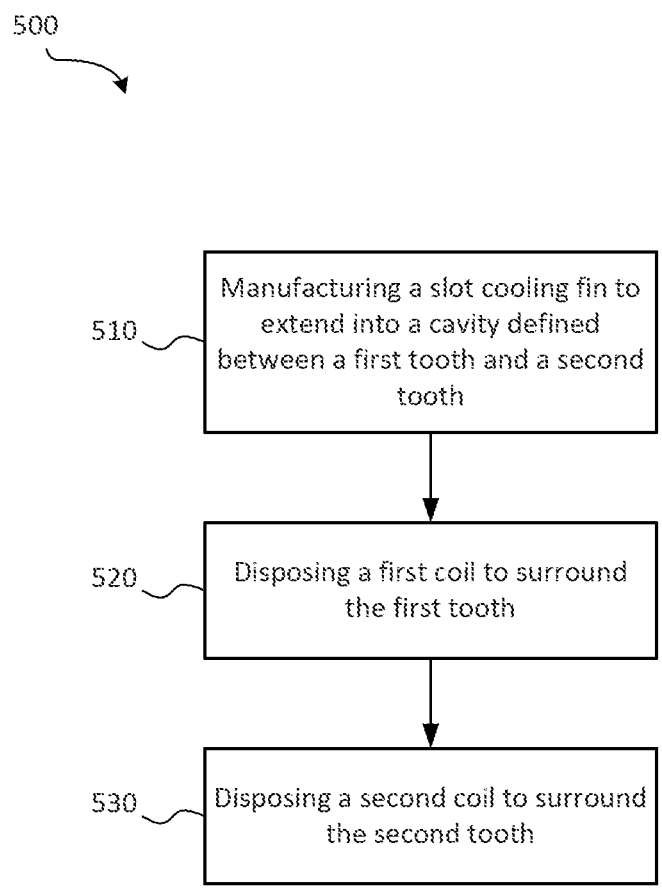
FIG. 5 is a schematic flow chart diagram of a method of manufacturing a stator for an electric machine, in accordance with various embodiments.

With reference to FIG. 5, a method 500 for manufacturing a stator of an electric machine is illustrated, in accordance with various embodiments. Method 500 includes manufacturing a slot cooling fin to extend into a slot defined between a first tooth, a second tooth, and a stator yoke (step 510). Method 500 includes disposing a first coil to surround the first tooth (step 520). Method 500 includes disposing a second coil to surround the second tooth (step 530).

With combined reference to FIG. 2B, FIG. 3A and FIG. 5, step 510 may include manufacturing slot cooling fin 252 to extend into slot 270 defined between first tooth 261, second tooth 262, and stator yoke 260. Step 510 may include additive manufacturing, subtractive manufacturing, or any other suitable manufacturing methods. Step 520 may include disposing first coil 351 to surround the first tooth 261. Slot cooling fin 252 may extend into first coil 351 in response to first coil 351 being wrapped around first tooth 261. Step 520 may include wrapping first coil 351 around first tooth 261. Step 530 may include disposing second coil 352 to surround second tooth 262. Step 530 may include wrapping second coil 352 around second tooth 262.

Figure 6A:
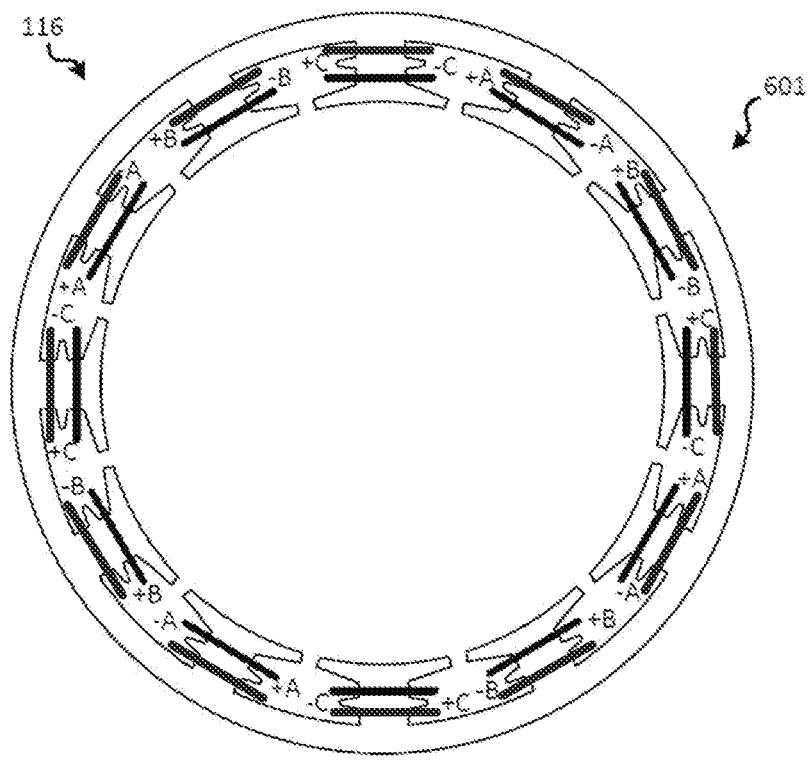
FIG. 6A is a schematic view of a double-layer concentrated winding architecture, in accordance with various embodiments.

With regards to FIG. 6A, a schematic view of a double-layer concentrated winding architecture 601 with planar members 116 is illustrated, in accordance with various embodiments. Double-layer concentrated winding architecture 601 may be similar to the winding architecture as illustrated in FIG. 4. In this regard, each slot of planar member 116 may include two separate windings (also referred to herein as coils).

Figure 6B:
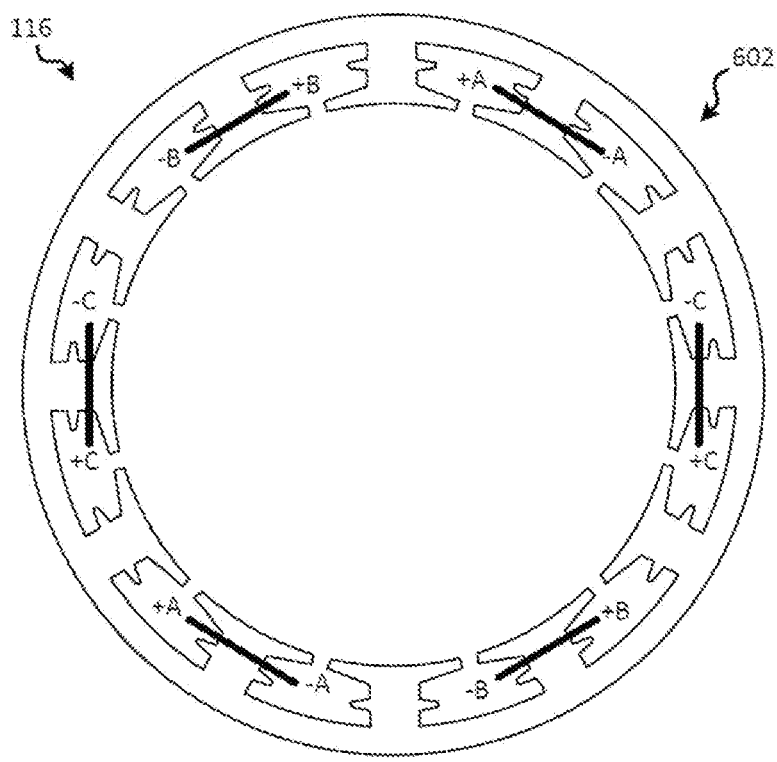
FIG. 6B is a schematic view of a single-layer concentrated winding architecture, in accordance with various embodiments.

With regards to FIG. 6B, a schematic view of a single-layer concentrated winding architecture 602 with planar members 116 is illustrated, in accordance with various embodiments. In this regard, each slot of planar member 116 may include a single winding (also referred to herein as coil).

Figure 6C:
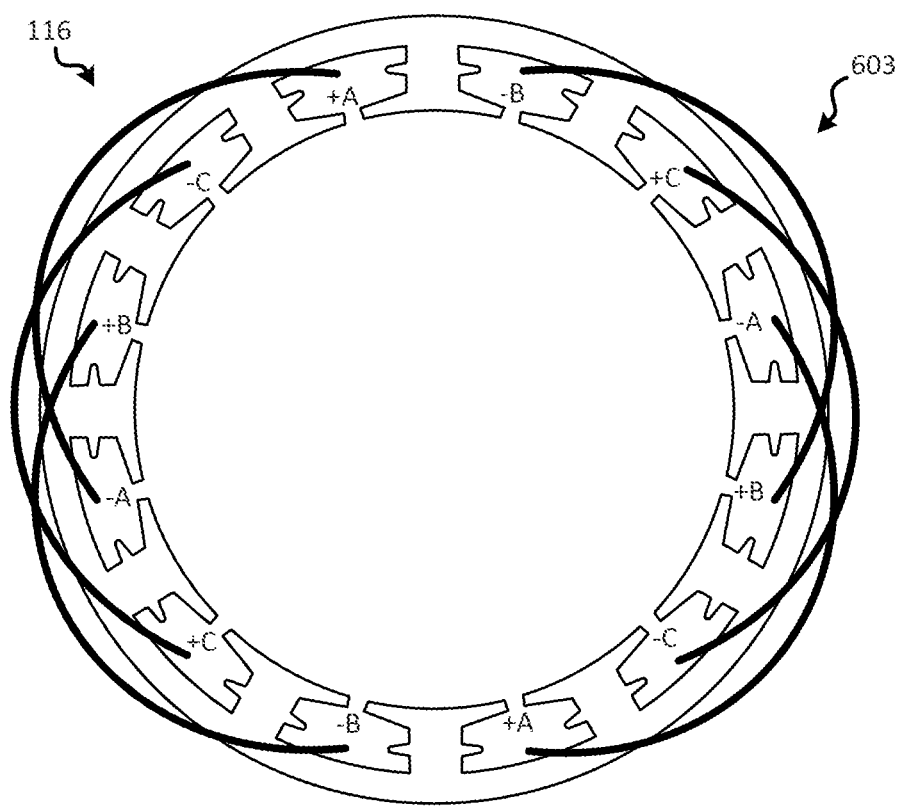
FIG. 6C is a schematic view of a distributed winding architecture, in accordance with various embodiments, in accordance with various embodiments.

With regards to FIG. 6C, a schematic view of a distributed winding architecture 603 with planar members 116 is illustrated, in accordance with various embodiments. In this regard, each slot of planar member 116 may include a single winding (also referred to herein as coil).

In this regard, slot cooling fins, as described herein, may be useful for various winding architectures including, but not limited to, the winding architectures as illustrated in FIG. 6A, FIG. 6B, and FIG. 6C.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a stator for an electric machine, the method comprising:
   manufacturing a planar member that includes a stator yoke comprising a first surface facing radially outward, a second surface facing radially inward, a plurality of teeth extending radially inward from second surface, a first tooth tip extending in a first direction from a proximal end of each tooth of the plurality of teeth into a first slot defined between a first tooth of the plurality of teeth and a second tooth of the plurality of teeth on a first side of the first tooth, a second tooth tip extending in a second direction opposite the first direction from the proximal end of each tooth of the plurality of teeth into a second slot defined between the first tooth of the plurality of teeth and a third tooth of the plurality of teeth on a second side of the first tooth opposite the first side, a first slot cooling fin disposed at a radial location on the first side of the tooth between the second surface of the stator yoke and the first tooth tip of the tooth, and a second slot cooling fin disposed at a radial location on the second side of the tooth between the second surface of the stator yoke and the second tooth tip of the tooth;
   disposing a first coil into the first slot such that the first coil surrounds the first slot cooling fin; and
   disposing a second coil into the second slot such that the second coil surrounds the second slot cooling fin.

2. The method of claim 1, wherein the stator yoke defines a central longitudinal axis.

3. The method of claim 2, further comprising:
   forming a first slot portion defined between the first tooth tip and the second surface;
   forming a second slot portion defined between the second tooth tip and the second surface; and
   wherein the first slot cooling fin extends into the first slot portion, and
   wherein the second slot cooling fin extends into the second slot portion.

4. The method of claim 2, wherein a first end of the first slot cooling fin is coupled to the tooth and a second end of the first slot cooling fin extends into the first slot in a cantilevered manner.

5. The method of claim 1, wherein the first slot cooling fin has a tapered geometry.

6. The method of claim 1, wherein the first slot cooling fin has a keyhole geometry.

7. The method of claim 1,
   wherein the first slot cooling fin is disposed substantially halfway between the second surface of the stator yoke and the first tooth tip of the tooth.

8. The method of claim 1, wherein the first slot cooling fin extends from the first side of the tooth in a first circumferential direction.

9. The method of claim 4, wherein a first end of the second slot cooling fin is coupled to the tooth and a second end of the second slot cooling fin extends into the second slot in a cantilevered manner.

10. The method of claim 7, wherein a first end of the second slot cooling fin is coupled to the tooth and a second end of the second slot cooling fin extends into the second slot in a cantilevered manner.

11. The method of claim 8, wherein the second slot cooling fin extends from the second first side of the tooth in a second circumferential direction opposite the first circumferential direction.

12. The method of claim 1, wherein the second slot cooling fin has a tapered geometry.

13. The method of claim 1, wherein the second slot cooling fin has a keyhole geometry.

14. The method of claim 1, wherein the second slot cooling fin is disposed substantially halfway between the second surface of the stator yoke and the second tooth tip of the tooth.

* * * * *